United States Patent [19]
Ueno

[11] Patent Number: 5,329,371
[45] Date of Patent: Jul. 12, 1994

[54] LOUDSPEAKER SYSTEM AUTOMATICALLY SWITCHED BETWEEN VIDEO AND AUDIO UNITS

[75] Inventor: Shigemi Ueno, Tokyo, Japan

[73] Assignee: Sony Corporation, Tokyo, Japan

[21] Appl. No.: 988,178

[22] Filed: Dec. 9, 1992

[30] Foreign Application Priority Data

Dec. 13, 1991 [JP] Japan .................................. 3-351894
Nov. 4, 1992 [JP] Japan .................................. 4-319346

[51] Int. Cl.⁵ .......................................... H04N 5/268
[52] U.S. Cl. .................... 348/738; 358/190; 358/181; 381/81; 348/730; 348/706
[58] Field of Search ............ 358/198, 181, 190, 194.1; 381/86, 80, 81; H04N 5/268, 5/44

[56] References Cited

U.S. PATENT DOCUMENTS

| | | | |
|---|---|---|---|
| 4,525,820 | 6/1985 | Enoki et al. | 381/81 |
| 4,651,342 | 3/1987 | Mengel | 358/190 |
| 4,691,361 | 9/1987 | Yoshino et al. | 381/86 |
| 5,097,249 | 3/1992 | Yamamoto | 358/194.1 |
| 5,161,198 | 11/1992 | Noble | 381/81 |
| 5,218,643 | 6/1993 | Nagashima | 381/86 |

FOREIGN PATENT DOCUMENTS 0054880  3/1989  Japan ........................... H04N 5/44

*Primary Examiner*—Victor R. Kostak
*Assistant Examiner*—Murrell: Jeffrey S.
*Attorney, Agent, or Firm*—Lewis H. Eslinger; Jay H. Maioli

[57] ABSTRACT

An acoustic sound reproducing system includes an audible signal reproducing apparatus, television receiver and a speaker system. The audible signal reproducing apparatus and the speaker system are connected to the television receiver. The television receiver has a power switch and a selecting switch which exchanges an output signal from the audio signal reproducing apparatus for an output signal from the television receiver when the power switch is changed to an on-position.

10 Claims, 4 Drawing Sheets

LOUDSPEAKER SYSTEM AUTOMATICALLY SWITCHED BETWEEN VIDEO AND AUDIO UNITS

BACKGROUND

1. Field of the Invention

The present invention relates generally to an acoustic sound reproducing apparatus for use as a speaker. More particularly, the present invention relates to reproducing the output signal from a television receiver and an audio reproducing apparatus.

2. Background of the Invention

In general, a television receiver or an audio reproducing apparatus need at least one speaker to reproduce sound. Users can hear the sound demodulated by the television receiver or reproduced by the audible reproducing apparatus through the speaker. Speakers are conventionally provided on each of the television receiver and the audio signal reproducing apparatus. In other words, the television receiver has at least one speaker and the audio signal reproducing apparatus has at least one speaker. The television receiver and the audio signal reproducing apparatus are set in a common listening room. The television receiver and the audio signal reproducing are not generally operated at the same time, because the user cannot simultaneously hear the reproduced sound from the receiver and the audio reproducing apparatus. For this reason, the utilization efficiency of each of the speakers is reduced. The space efficiency of the listening room is also reduced when the listening room has a plurality of speakers. If the audio signal is reproduced with a stereophonic sound reproducing method like a surround sound method, it is necessary to have at least four speakers. The listening room has three speakers for the television receiver and another four speakers for the audio reproducing apparatus, the space efficiency of the listening room is further reduced.

SUMMARY OF THE INVENTION

It is, therefore, an object of the present invention to provide an acoustic sound reproducing apparatus which resolves the above mentioned problems.

It is another object of the present invention to provide a television receiver for the acoustic sound reproducing apparatus.

According to a first embodiment of the present invention, there is provided an acoustic sound reproducing apparatus having a first audio signal reproducing apparatus, a second audio signal reproducing apparatus, a selector and at least one speaker. The selector selects the second audio signal reproducing apparatus for the first audible signal reproducing apparatus when the power switch is on. The speaker is supplied an output signal from the first or second audio signal reproducing apparatus through the selector.

According to a second embodiment of the present invention, there is provided a television receiver including a demodulator, an amplifier, a selector, an input terminal and a power switch. The amplifier is supplied an output signal from the demodulator. The selector selects the output signal from the amplifier and the input signal through the input terminal. The power switch controls the selector to change the input signal through the input signal for the output signal of the amplifier.

According to a third embodiment of the present invention, there is provided an acoustic reproducing system having a television receiver, an audio signal reproducing apparatus and at least one speaker. The audio signal reproducing apparatus is connected to the television receiver. The television receiver includes a selector and a power switch. The selector exchanges the output signal of the audio signal reproducing apparatus for the output signal from the demodulator when the power switch is on, so that the speaker is connected to the television receiver.

In the above-described invention, the selector selects the output signal of the demodulator of the television receiver when the power switch is changed to the on-position. At this time, the speaker is supplied the output signal from the demodulator. On the other hand, the selector selects the output signal from the audible signal reproducing apparatus when the power switch is off. At this time, the speaker is supplied the output signal from the audible signal reproducing apparatus. As a result, the television receiver and the audible signal reproducing apparatus commonly use a single speaker or set of speakers.

BRIEF DESCRIPTION OF THE DRAWING

The invention will be more readily understood with reference to the accompanying drawing, wherein.

DESCRIPTION OF THE INVENTION

Figure 1:
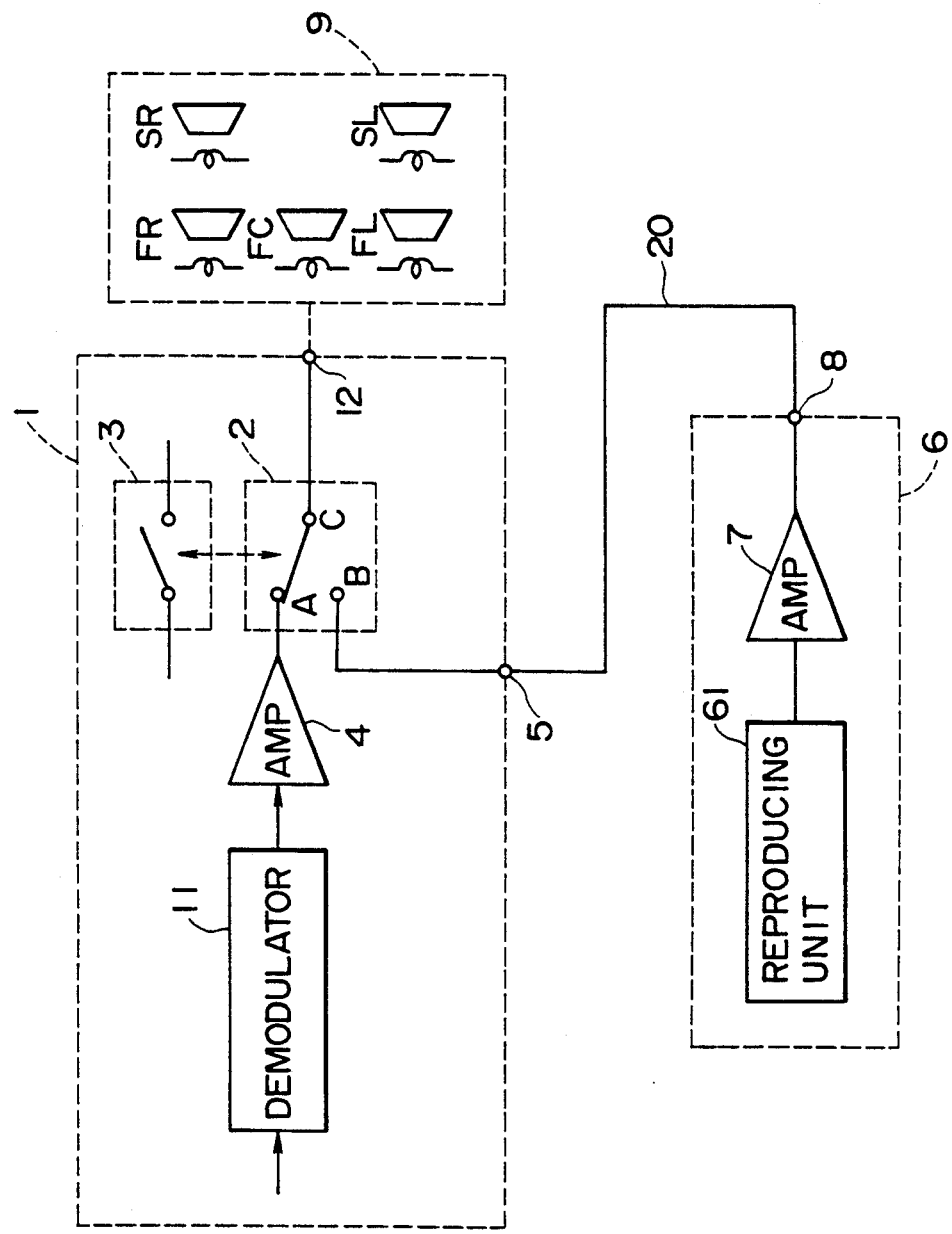
FIG. 1 shows a principal block diagram of the present invention.

Referring to the drawings, the preferred embodiments of the present invention will be explained in detail.

FIG. 1 shows a principal diagram of an acoustic signal reproducing apparatus of the present invention. An acoustic signal reproducing system of the present invention includes a television receiver 1, an audible signal reproducing apparatus 6 and a speaker system 9.

The television receiver 1 has a demodulating circuit 11, a selecting switch 2, a power switch 3, an amplifier 4, an external input terminal 5 and an external output terminal 12. The demodulating circuit 11 demodulates a signal received by an antenna. The demodulating circuit 11 outputs a demodulated video signal and a demodulated audio signal. The demodulated video signal is supplied to a display driving circuit. The demodulated audio signal is supplied to the amplifier 4. The output terminal of the amplifier 4 is connected to a fixed terminal A of the selecting switch 2. The external input terminal 5 is connected to a fixed terminal B of the selecting switch 2. The movable terminal C is connected to the external output terminal 12. The movable terminal C is connected to the fixed terminal B as the power switch 3 is changed to an off-position. When the power switch 3 is changed to an on-position, the movable terminal C is connected to the fixed terminal A. The power switch 3 and the selecting switch 2 are synchronized.

The audio signal reproducing apparatus, for example a digital audio disc player, a tape recorder, a video disc player, a video tape recorder, a tuner or the like, includes a reproducing unit 61, an amplifier 7 and an external output terminal 8. An output signal reproduced by the reproducing unit 61 is supplied to the amplifier 7. The output terminal of the amplifier 7 is connected to the external output terminal. The amplifier 7 amplifies the output signal from the reproducing unit 61 and outputs the output signal from the reproducing apparatus 6 as a signal to the external output terminal 8. The external output terminal 8 and the external input terminal 5 are connected with a connecting cable 20. In the result, the signal from the amplifier 7 is supplied to the speaker system 9 through the external input terminal 5 and the fixed terminal B of the selecting switch 2.

The speaker system 9 is connected to the external output terminal 12 of the television receiver 1, so that the speaker system 9 is used commonly by both the television receiver 1 and the audio signal reproducing apparatus 6. The speaker system 9 has at least one loudspeaker unit. If the audible signal is reproduced with a surround stereophonic sound reproducing method, the speaker system 9 may have five loudspeaker units as shown in FIG. 1. In this case, the loudspeaker units are each arranged at a front right position (FR), a front left position (FL), a front center position (FC), a surround right position (SR) and a surround left position (SL) respectively.

According to above mentioned structure, the television receiver 1 is actuated when the power switch 3 is changed to the on-position. The movable terminal C of the selecting switch 2 is connected to the fixed terminal A and is synchronously operated when the power switch 3 is switched. As a result, the output signal amplified by the amplifier 4 is supplied to the speaker system 9 through the fixed terminal A and the movable terminal C of the selecting switch 2, and the output signal from the television receiver 1 is reproduced by the speaker system 9.

When the power switch 3 is changed to the off-position, the television receiver 1 is turned off and the movable terminal is connected to the fixed terminal B of the selecting switch 2, so that the output signal amplified by the amplifier 7 is supplied to the speaker system 9 through the external output terminal 8, the external input terminal 5, the fixed terminal B and the movable terminal C. The speaker system 9 reproduces the output signal from the audio signal reproducing apparatus 6.

Figure 2:
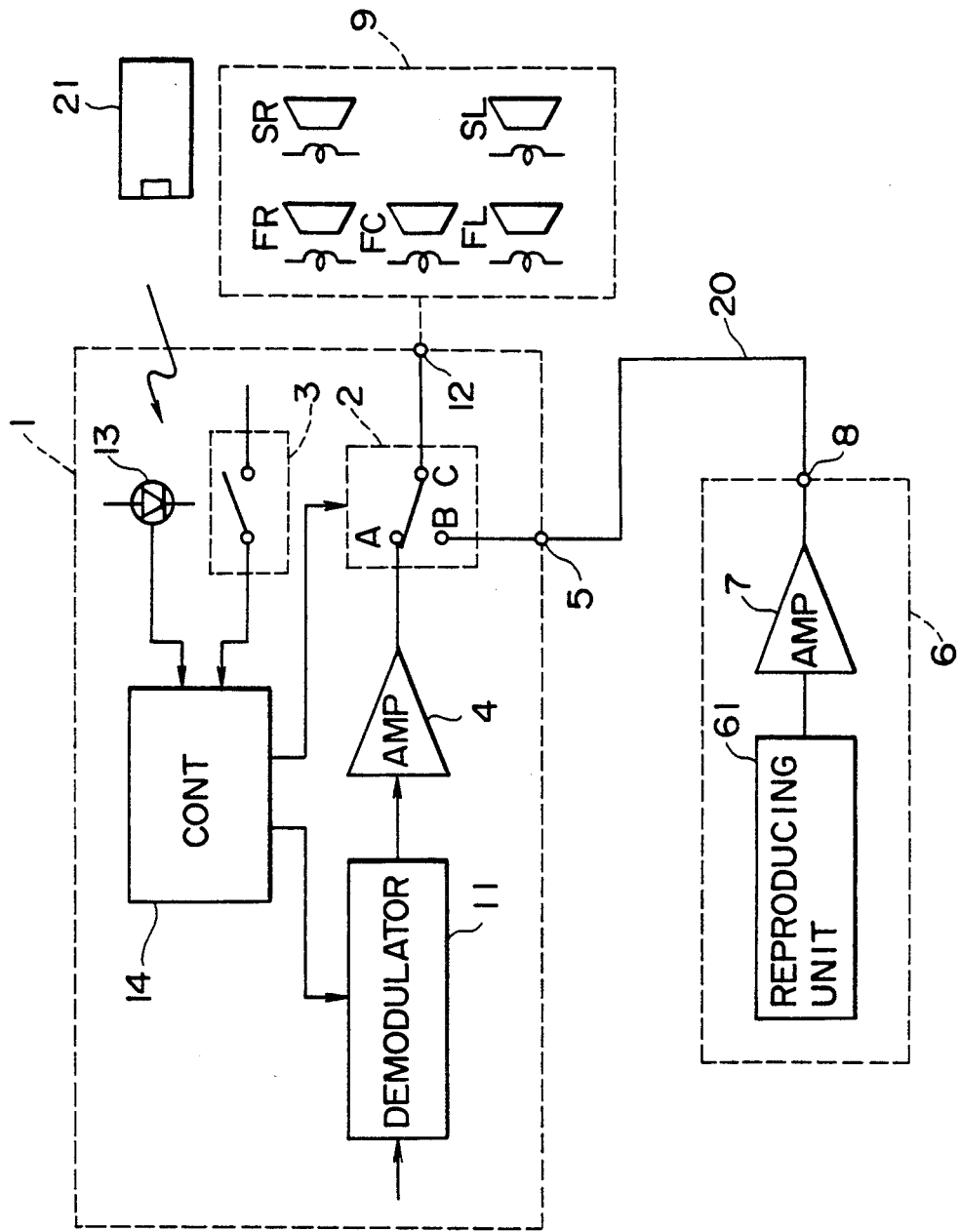
FIG. 2 shows a block diagram according to a first embodiment of the present invention.

FIG. 2 shows a first embodiment of the acoustic signal reproducing apparatus of the present invention. In FIG. 2, like elements corresponding to FIG. 1 are identified by the same reference numerals and will not be described. As shown in FIG. 2, the television receiver 1 further includes a photodetector 13, and a controller 14. The television receiver 1 is controlled by control signals from a remote control device 21. A photodetector 13 receives infrared rays emitted from a remote control device 21. The photodetector 13 and the power switch 3 are connected to a controller 14. The controller 14 may include like a microprocessor. The control signals from the controller 14 are supplied to the demodulator 11, the selecting switch 2 and the other elements of the television receiver 1. The remote control device 21 has an input keyboard and a light source. The light source emits the infrared ray according to the input data entered by a user with the input keyboard. The outputted infrared ray is received by the photodetector 13. The output signal from the photodetector 13 is supplied to the controller 14. The controller 14 generates control signals related to the output signal from the remote control device 21 as the detecting signal of the photodetector 13. As a result, the demodulator 11 and the other elements of the television receiver 1 are controlled.

When the power switch 3 is changed to the on-position or when the controller 14 receives an equivalent command from the remote control device 21, the controller 14 generates a control signal after a predetermined time period for example 200 msec. The generated control signal is supplied to the selecting switch 2. As a result, the movable terminal C is connected to the fixed terminal A. The speaker system 9 is supplied to the output signal from the demodulator 11 through the selecting switch 2 and the external output terminal 12.

When the power switch 3 is changed to the off-position or when the controller 14 receives an equivalent command from the remote control device 21, the controller 14 generates a control signal. The generated control signal is supplied to the selecting switch 2. The movable terminal C is connected to the fixed terminal B. After a predetermined time period, for example 200 msec, when the controller 14 receives the output signal which means the power is off, the controller 14 generates another control signal. This other control signal is supplied to a power supply circuit of the television receiver 1. As the result, the television receiver 1 is turned off and the output signal from the audio signal reproducing apparatus is supplied to the speaker system 9.

Figure 3:
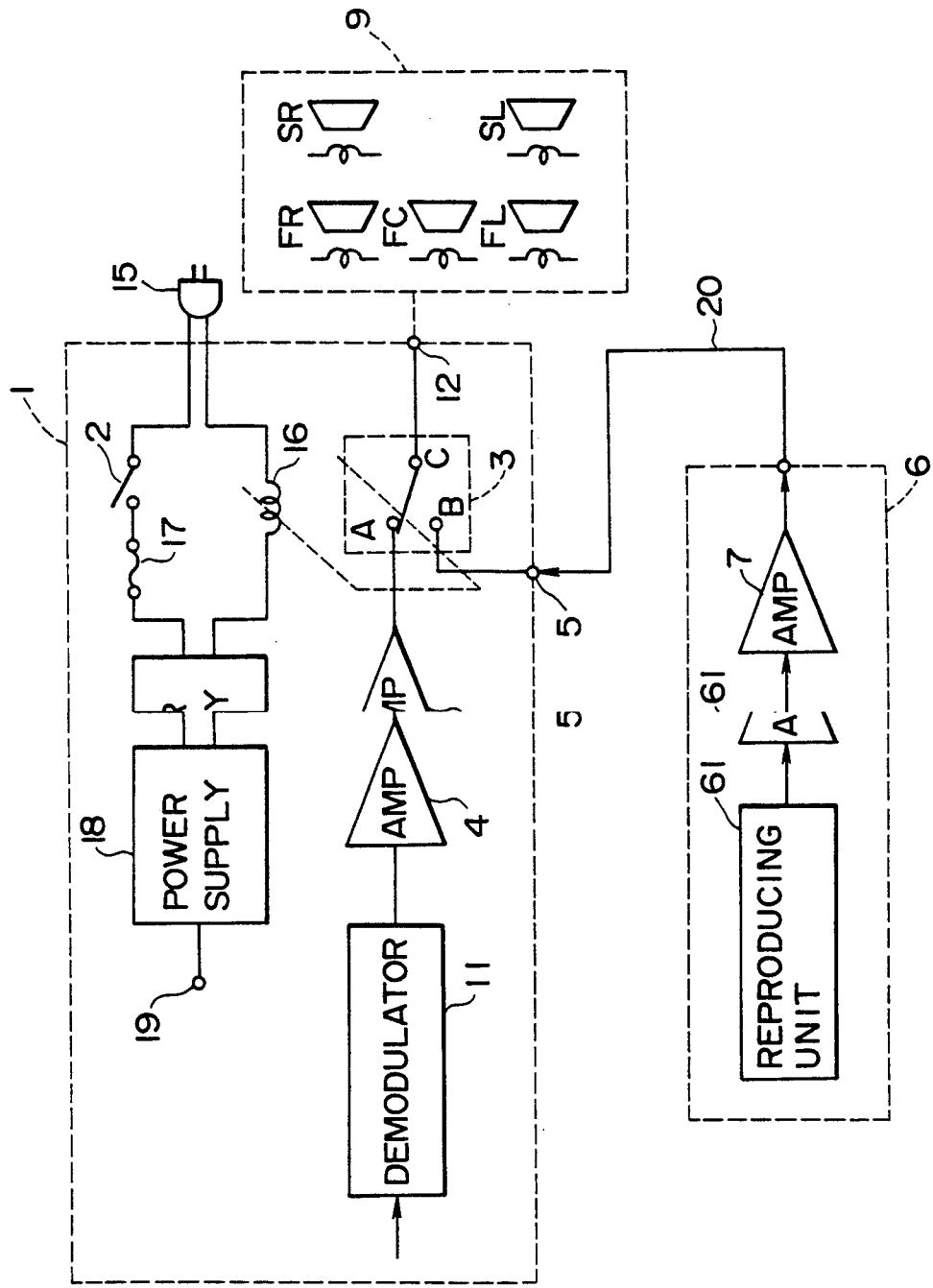
FIG. 3 shows a block diagram according to a second embodiment of the present invention.

FIG. 3 shows a second embodiment of the audio signal reproducing apparatus according to the present invention. In FIG. 3, like elements corresponding to those in FIG. 1 are identified by the same reference numerals and will not be described. As shown in FIG. 3, the television receiver 1 further includes a plug 15, a relay 16, a fuse 17, a power supply circuit 18 and a output terminal 19. The plug 15 is connected to an AC power source. The relay 16 is connected in parallel to the power switch 3. The fuse 17 is connected to the power switch 3 in series. The power supply circuit 18 converts AC voltage to DC voltage and supplies DC voltage through the output terminal 19 to the elements of the television receiver 1. The relay 16 changes the movable terminal C between the fixed terminal A and the fixed terminal B when the power switch 3 is changed to the on-position.

When the plug 15 connected to the AC power source and the power switch 3 is changed to the on-position, the relay 16 is energized. As a result, the movable terminal C of the selecting switch 2 is changed from the fixed terminal B to the fixed terminal A by the relay 16. At this time, the television receiver 1 is supplied DC voltage by the power supply circuit 18. The output signal from the television receiver 1 is supplied to the speaker system 9.

When the power switch 3 is changed to the off-position, the movable terminal C is connected to the fixed terminal B and the television receiver 1 is powered off. The output signal from the audio signal reproducing apparatus 6 is supplied to the speaker system 9.

In addition, if the relay 16 is a DC relay which works on DC voltage, the relay 16 may be inserted between the power supply circuit 18 and the output terminal 19.

Figure 4:
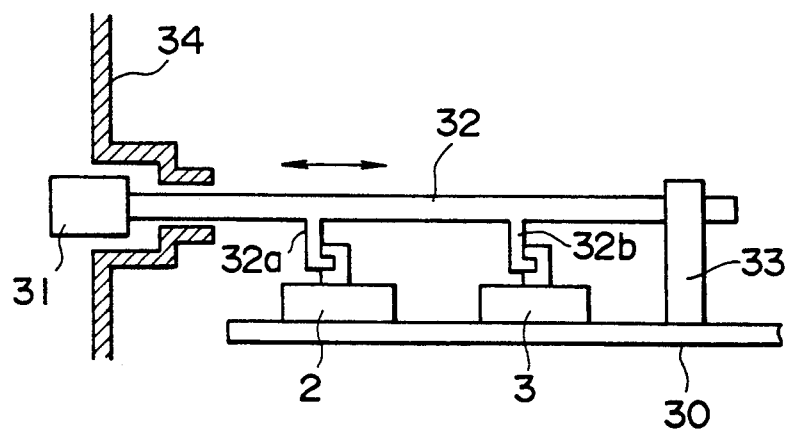
FIG. 4 is a schematic side view for illustrating a television receiver to a third embodiment of the present invention.

FIG. 4 shows a third embodiment of the audio signal reproducing apparatus according to the present invention. FIG. 4 is a schematic side view of a portion of the television receiver 1. The television receiver 1 has a circuit board 30, a button 31, a rod member 32, a supporting member 33 and a cabinet 34. The selecting switch 2, the power switch 3 and the supporting member 33 are mounted on the circuit board. The circuit board 30 is provided in the cabinet 34. The button 31 is made of resin. The surface of the button 31 may be formed with a metal layer. The button 31 is arranged in a recess portion formed in a front portion the cabinet 34. The button 31 is connected to one of end of the rod member 32. The rod member is inserted in an opening of the recess portion of the cabinet 34. The rod member 32 is formed with a pair of projections 32a, 32b. The pair of projections 32a, 32b are connected to each of the switches 2, 3, respectively. One end portion of the rod member 32 is supported with the recess portion of the cabinet 34. The other end portion of the rod member 32 is supported with the supporting member 33 to allow movement in the parallel direction of the circuit board 30.

When the button 31 is pushed in a direction perpendicular to the front portion of the cabinet 34, the rod member 32 moves. As a result, the power switch 3 is changed to the on-position by the projection 32b. At the same time, the movable terminal C is connected to the fixed terminal A as shown in FIG. 1. The output signal from the television receiver 1 is supplied to the speaker system 9.

When the button 31 is again pushed in the same direction, the rod member 32 moves in the reverse direction due to a bias member, such as a spring, not shown. As a result, the power switch 3 is changed to the off-position and the movable terminal C of the selecting switch 2 is connected to the fixed terminal B by the rod member 32. At this time, the output signal from the audio signal reproducing apparatus is supplied to the speaker system from the audible signal reproducing apparatus 6.

Many variations of the invention will be apparent to those skilled in the art.

What is claimed is:

1. A television receiver including a demodulator for demodulating a received audio signal, said television receiver comprising:
   amplifier means for amplifying a demodulated audio signal from said demodulator;
   an external input terminal for receiving a second audio signal;
   selecting means for selecting one of the output audio signal from said amplifier means and the second audio signal through said input terminal; and
   electric power control means for controlling a supply of electric power to said demodulator and said amplifier means and for controlling said selecting means to exchange receipt of the second audio signal from said input terminal for the output signal from said amplifier means when said amplifier means is supplied with the electric power.

2. A television receiver according to claim 1, wherein said receiver further comprises synchronous means for synchronizing operation of said electric power control means and said selecting means.

3. A television receiver according to claim 2, wherein said synchronous means comprises a controller and input means, said controller receiving a signal from said input means and for generating a control signal in response to said signal from said input means and for supplying said control signal to said selecting means.

4. A television receiver according to claim 2, wherein said synchronous means comprises a relay, said relay changing said selecting means when said electric power control means supplies power to said demodulator and said amplifier means.

5. A television receiver according to claim 1, wherein said electric power control means comprises a power switch and mechanical link means, and said selecting means comprises a selecting switch, wherein said power switch and said selecting switch are connected by said mechanical link means to operate synchronously.

6. An acoustic sound reproducing system comprising:
   an audio signal reproducing apparatus;
   a television receiver including a demodulator for demodulating a received audio signal, selecting means, and electric power control means, said television receiver being connected to said audio signal reproducing apparatus, said selecting means exchanging the receipt of an output signal from said audio signal reproducing apparatus for an output signal of said demodulator when said electric power control means supplies power to said demodulator; and
   a speaker connected to said television receiver, said speaker being supplied with an output signal from said selecting means.

7. An acoustic sound reproducing system according to claim 6, wherein said television receiver further comprises synchronous means for synchronizing respective operations of said electric power control means and said selecting means.

8. An acoustic sound reproducing system according to claim 7, wherein said synchronous means comprises a controller and input means, said controller receiving an output signal from said input means and for generating a control signal in response to said output signal from said input means and for supplying said control signal to said selecting means.

9. An acoustic sound reproducing system according to claim 7, wherein said synchronous means comprises a relay, said relay changing said selecting means when said electric power control means supplies power to said demodulator.

10. An acoustic sound reproducing apparatus according to claim 6, wherein said electric power control means comprises a power switch and mechanical link means, and said selecting means comprises a selecting switch, wherein said power switch and said selecting switch connected by said mechanical link means to operate synchronously.

* * * * *

UNITED STATES PATENT AND TRADEMARK OFFICE
CERTIFICATE OF CORRECTION

PATENT NO. : 5,329,371
DATED : July 12, 1994
INVENTOR(S) : Shigemi Ueno

It is certified that error appears in the above-indentified patent and that said Letters Patent is hereby corrected as shown below:

Col. 4, line 9, after "period" insert --,--

In the claims:

Col. 6, line 57, after "switch" insert --are--

Signed and Sealed this

Fifth Day of March, 1996

Attest:

BRUCE LEHMAN

Attesting Officer

Commissioner of Patents and Trademarks